United States Patent
Kügele et al.

(10) Patent No.: US 10,714,766 B2
(45) Date of Patent: Jul. 14, 2020

(54) CONTROLLED GAS CONDITIONING FOR A REACTION GAS OF A FUEL CELL

(71) Applicant: AVL LIST GMBH, Graz (AT)

(72) Inventors: Christoph Kügele, Graz (AT); Stefan Jakubek, Vienna (AT); János Kancsár, Vienna (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 16/318,338

(22) PCT Filed: Jul. 17, 2017

(86) PCT No.: PCT/EP2017/067999
§ 371 (c)(1),
(2) Date: Jan. 16, 2019

(87) PCT Pub. No.: WO2018/015336
PCT Pub. Date: Jan. 25, 2018

(65) Prior Publication Data
US 2019/0245223 A1 Aug. 8, 2019

(30) Foreign Application Priority Data

Jul. 20, 2016 (AT) .............................. A50663/2016

(51) Int. Cl.
*H01M 8/04089* (2016.01)
*H01M 8/04701* (2016.01)
(Continued)

(52) U.S. Cl.
CPC ... *H01M 8/04089* (2013.01); *H01M 8/04708* (2013.01); *H01M 8/04753* (2013.01); *H01M 8/04835* (2013.01); *H01M 8/04992* (2013.01)

(58) Field of Classification Search
None
See application file for complete search history.

(56) References Cited

U.S. PATENT DOCUMENTS

2006/0125441 A1* 6/2006 Kolodziej ......... H01M 8/04305
320/101
2009/0065367 A1 3/2009 Heselmans
(Continued)

FOREIGN PATENT DOCUMENTS

WO 2005069090 A1 7/2005

OTHER PUBLICATIONS

Chang. Linearization and Input-Output Decoupling for Nonlinear Control of Proton Exchange Membrane Fuel Cells. (Year: 2014).*
(Continued)

*Primary Examiner* — Haroon S. Sheikh
(74) *Attorney, Agent, or Firm* — Dykema Gossett PLLC (57) ABSTRACT

The aim of the invention is to allow a precise and quick regulation of the influencing variables in the operation of a fuel cell. A regulator is used for the regulation, said regulator being designed on the basis of a model of the gas conditioning unit in the form of a coupled nonlinear multivariable system in that the coupled nonlinear multivariable system is decoupled and linearized using Lie derivatives, and the regulator is designed for the decoupled linear multivariable system. The regulator calculates the control variables ($u_G$, $u_S$, $u_N$, Q) for at least three present actuators of the influencing variables of the gas conditioning unit at each sampling time of the regulation using specified target variables ($y_{j,dmd}$), and at least the three actuators of the gas conditioning unit adjust the calculated control variables ($u_G$, $u_S$, $u_N$, Q) at each sampling time of the regulation.

7 Claims, 3 Drawing Sheets

(51) Int. Cl.
    *H01M 8/04746*    (2016.01)
    *H01M 8/04828*    (2016.01)
    *H01M 8/04992*    (2016.01)

(56) References Cited

U.S. PATENT DOCUMENTS

| | | |
|---|---|---|
| 2010/0230370 A1 | 9/2010 | Schneider et al. |
| 2015/0295258 A1 | 10/2015 | Knies et al. |
| 2016/0020476 A1* | 1/2016 | Crisalle ................ A61K 31/202    429/432 |

OTHER PUBLICATIONS

Woon Ki Na et al: "Feedback-Linearization-Based Nonlinear Control for PEM Fuel Cells", IEEE Transactions on Energy Conversion, IEEE Service Center, Piscataway, NJ, US, vol. 23, No. 1, Mar. 1, 2008 (Mar. 1, 2008), pp. 179-190, XP011204387, ISSN: 0885-8969.
Cédric Damour et al: "A novel non-linear model-based control strategy to improve PEMFC water management—The flatness-based approach", International Journal of Hydrogen Energy., vol. 40, No. 5, Feb. 1, 2015 (Feb. 1, 2015), GB, pp. 2371-2376, XP055411260, ISSN: 0360-3199, DOI: 10.1016/j.ijhydene.2014.12.052.

* cited by examiner

CONTROLLED GAS CONDITIONING FOR A REACTION GAS OF A FUEL CELL

CROSS-REFERENCE TO RELATED APPLICATIONS

This application is a national stage filing based upon International PCT Application No. PCT/EP2017/067999, filed 17 Jul. 2017, which claims the benefit of priority to Austria application No. A50663/2016, filed 20 Jul. 2016, the disclosures of which are incorporated herein by reference.

BACKGROUND

The present invention relates to controlled gas conditioning for a reaction gas of a fuel cell and a method for controlling gas conditioning for a fuel cell for the operation of the fuel cell.

Fuel cells are viewed as the energy source of the future, in particular also for mobile application in vehicles of any type. For this purpose, the proton exchange membrane fuel cell (PEMFC) has emerged as one of the most promising technologies, because it can be operated at low temperatures, offers high response times, and has a high power density and can be operated emission-free (reaction partners only hydrogen and oxygen). In addition, however, there is also a number of other fuel cell technologies, for example, an alkaline fuel cell (AFC), a direct methanol fuel cell (DMFC), a direct ethanol fuel cell (DEFC), a molten carbonate fuel cell (MCFC), a solid oxide fuel cell (SOFC), etc. A fuel cell uses one reaction gas in each case for the anode and for the cathode, for example, oxygen $O_2$ (or air) and hydrogen $H_2$, which react electrochemically to generate electrical current. The designs and the functions of the various fuel cells are sufficiently known, because of which they will not be discussed in greater detail here. A conditioning of the reaction gases is not absolutely necessary for operation of a fuel cell. However, the durability and performance and also power density, which are necessary for cost-effective and efficient use of fuel cells, for example, in a vehicle, can only be achieved with correct gas conditioning. It can be necessary in dependence on the type of the fuel cell to condition only one of the reaction gases or both reaction gases. The correct process control of a fuel cell, which includes in particular the gas conditioning, is decisive for the performance, durability, and the safe operation of the fuel cell, in particular also in the event of external and internal disturbances. In general, a faulty procedural process control results in a reversible or irreversible power loss (degradation) in fuel cells. An indicator for the present performance of a fuel cell is represented by the state of health (SoH). If a fuel cell reaches a defined value of the SoH (typically 80% of the continuous output in the new state in an automobile), this is referred to as end of service, which is undesirable and is to be avoided, of course.

For gas conditioning, the state variables pressure, temperature, and relative humidity (p, T, rH), and also the mass flow of the reaction gas are decisive.

For example, an excessively low mass flow results in a reactant deficiency, which immediately negatively influences the output and causes irreversible damage to the fuel cell depending on the duration and intensity. A further important influencing variable is the pressure of the reaction gas. A certain pressure gradient between anode and cathode does have a positive influence on the operation, but the membrane and thus the fuel cell are damaged in the event of an excessively large differential pressure. The relative humidity of the reaction gas represents a further example. In a proton exchange membrane fuel cell it is decisive, for example, to protect the membrane from drying out, since only a hydrated membrane conducts hydrogen cations and is thus efficient. However, a blockage of the gas channels and the diffusion paper by an excessive amount of liquid water, which results in reactant undersupply, also has to be avoided. In addition, a cyclic humidification and dehumidification of the membrane results in mechanical stress thereof and thus in turn in cracks and flaws (pinholes) in the membrane, which promote direct passage of hydrogen and oxygen. Both effects therefore again have a negative influence on the performance and state of health of a fuel cell. Not least, the temperature also plays a role. In addition to the accelerated chemical decomposition of the membrane at higher temperatures, the relative humidity and the temperature are also physically coupled, whereby the latter can also induce the above-mentioned effects. The mentioned examples only represent an excerpt of the possible effects in the event of deficient gas conditioning and are to serve for better comprehension of the problems.

The significant problem for gas conditioning is that the four mentioned influencing variables are dependent on one another because of physical (for example, thermodynamic) relationships and in addition have nonlinear behavior. This problem is often bypassed in that the components of the gas conditioning and the controlling concept for the gas conditioning are adapted to one another. Quite simple control based on characteristic maps, characteristic values, characteristic points, etc., together with simple controllers (for example, PID controllers) is thus largely sufficient. It is also possible that the parameters of the control (characteristic maps, characteristic values, characteristic points) are provided with correction factors in dependence on the SoH.

If one wishes to fully exhaust the possibilities of a fuel cell, such a simple control of the gas conditioning is often not sufficient. In particular, (highly) dynamic operation of the fuel cell (on the test stand or in the real application) generally cannot be implemented thereby. (Highly) dynamic operation is understood in this case in particular as a rapid response behavior of the control, i.e., the control is capable of following even rapid changes in the setpoint variables of the control with the least possible control deviation. Above all in the case of the development of a fuel cell on a test stand, where one generally wishes to subject the fuel cell to dynamic test runs (in the sense of the rate of change of the influencing variables, but also of the load of the fuel cell), in order to check or improve the behavior of the fuel cell, this is a problem.

Therefore, a controller which is capable of setting the controlled variables rapidly and accurately and above all also transiently is required for a dynamic control of the gas conditioning.

Various approaches for the control of the gas conditioning of a fuel cell are found for this purpose in the literature. Many of these approaches are based on a simplification to different extents of the thermodynamic relationships. Usually, only two of the mentioned influencing variables are controlled and assumptions are made for the other influencing variables. A suitable controller is then designed for this purpose. In most cases, the pressure or the humidity is controlled in this case. One example of this is Damour C. et al. "A novel non-linear model-based control strategy to improve PEMFC water management—The flatness-based approach," Int. Journal of Hydrogen Energy 40 (2015), p. 2371-2376. A controller for the relative humidity using the known theory of differential flatness on the basis of a model of the membrane moisture is formulated therein. The flatness-based controller displays outstanding behavior of the setpoint value tracking, a high level of interference suppression, and a high stability. Nonetheless, not all influencing variables can thus be controlled, which makes this controller unsuitable for the intended control of the gas conditioning.

It is therefore an object of the present invention to specify controlled gas conditioning for a reaction gas of a fuel cell, and a corresponding control method for this purpose, which enable accurate and rapid control of influencing variables of the operation of the fuel cell.

SUMMARY OF THE INVENTION

This object is achieved according to the invention by the features of the independent claims. The invention is based on the concept that the highly nonlinear and coupled multivariable system, which results from the mathematical modeling of the gas conditioning unit, may be decoupled and linearized by applying the Lie derivatives. For the linear, non-coupled multivariable system resulting therefrom, a controller can then be designed using conventional linear control theory. In this manner, the gas conditioning unit can be accurately modeled with respect to the influencing variables, which represents a condition for accurate, rapid control of the influencing variables.

BRIEF DESCRIPTION OF THE DRAWINGS

The present invention will be explained in greater detail hereafter with reference to FIGS. 1 to 4, which show advantageous embodiments of the invention by way of example, schematically, and non-restrictively. In the figures.

DETAILED DESCRIPTION

The invention will be explained in greater detail hereafter with reference to FIG. 1 without restriction of the generality on the basis of the example of a test stand 1 for a proton exchange membrane fuel cell (PEMFC) 2. Of course, the fuel cell 2 could also be used as an electrical supply in a machine or facility. The gas conditioning and the control would then be implemented in this machine or facility for this purpose. When reference is made hereafter to the operation of a fuel cell 2, it is therefore always understood as the operation of the fuel cell 2 on a test stand 1 and the real operation of the fuel cell 2 in a machine or facility.

Figure 1:
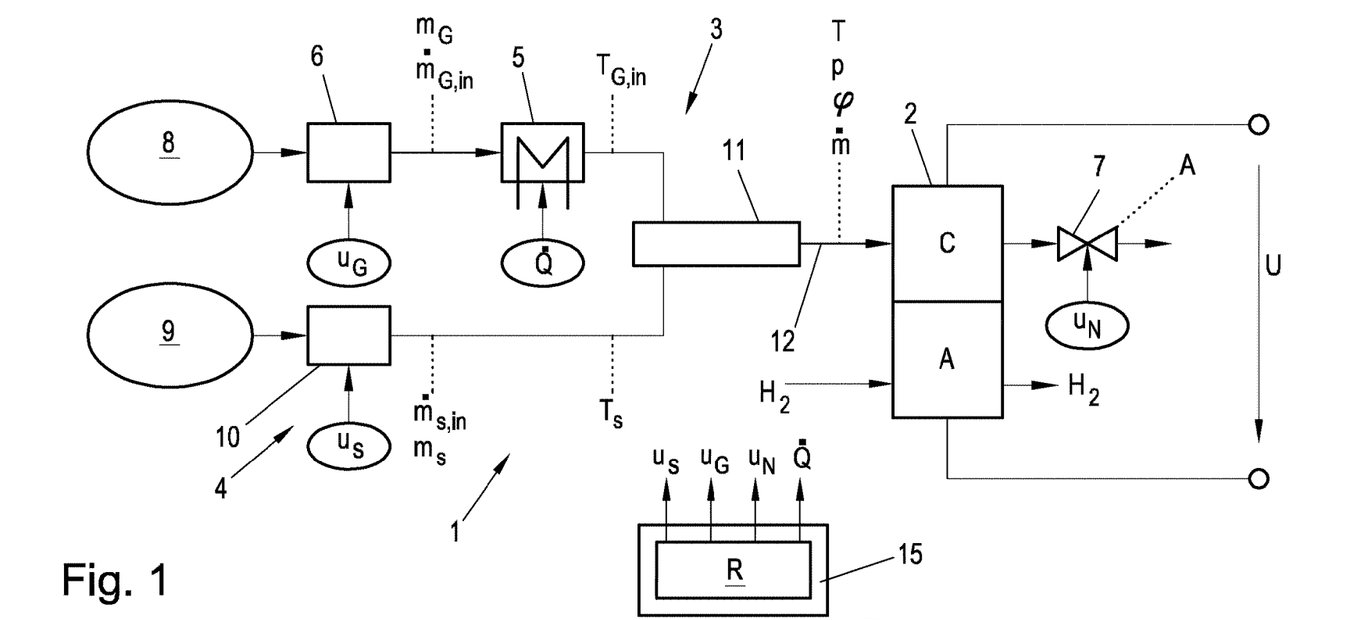
FIG. 1 shows a test stand for a fuel cell having gas conditioning according to the invention.

The fuel cell 2 is arranged in the example according to FIG. 1 on the test stand 1 and is operated on the test stand 1. As is sufficiently known, the fuel cell 2 comprises a cathode C, to which a first reaction gas, for example, oxygen, also in the form of air, is supplied, and an anode A, to which a second reaction gas, for example, hydrogen $H_2$, is supplied. The two reaction gases are separated from one another in the interior of the fuel cell 2 by a polymer membrane. An electrical voltage U can be tapped between cathode C and anode A. This fundamental structure and function of a fuel cell 2 are well-known, because of which they will not be discussed in greater detail here.

At least one reaction gas, generally the reaction gas feeding oxygen, in particular air, is conditioned in a gas conditioning unit 3. In the gas conditioning unit 3, the pressure p, the relative humidity φ, the temperature T, and the mass flow ṁ of the conditioned reaction gas are set in FIG. 1, these four influencing variables are indicated at the input of the cathode C. According to the invention, at least three, preferably all four, of these four influencing variables are conditioned in this case. "Conditioning" in this case means that the value of an influencing variable is controlled to a predefined value, i.e. a setpoint variable. In the case of an influencing variable which is not conditioned using the gas conditioning unit 3, assumptions can be made for this influencing variable, for example, this influencing variable can be kept constant.

Corresponding actuators are provided in the gas conditioning unit 3 for controlling these influencing variables. In particular, a humidifier unit 4 for humidifying the reaction gas to set a relative humidity φ of the reaction gas, a temperature control unit 5 for the temperature control of the reaction gas to set a temperature T of the reaction gas, a mass flow control unit 6 for controlling the mass flow ṁ of the reaction gas, and a pressure control unit 7 for controlling the pressure p of the reaction gas are provided. Analogously to the influencing variables to be conditioned, at least three of these four units, preferably all four, are provided in the gas conditioning unit 3. Of course, a gas source 8 for the reaction gas is also provided, which is connected to the gas conditioning unit 3 or is also arranged in the gas conditioning unit 3.

The gas source 8 is, for example, a pressure reservoir having compressed, dry reaction gas, for example, air. Alternatively, if air is used, ambient air can also be processed, for example, filtered, compressed, dried, etc. as the gas source 8.

The temperature control unit 5 is, for example, an electrical heating and cooling unit or heat exchanger. A unit as described in AT 516 385 A1 can also be used as the temperature control unit.

The humidifier unit 4 comprises in this exemplary embodiment a water vapor generator 9, a mass flow controller 10 for the water vapor, and a mixing chamber 11. Conventional, suitable, commercially available, controllable mass flow controllers can be used as the mass flow controller 10 for the water vapor, and also as the mass flow control unit 6 for the reaction gas. The water vapor is mixed in the mixing chamber 11 with the gas originating from the gas source 8 to form the conditioned gas for the fuel cell 2.

Of course, other embodiments of a humidifier unit 4 are also conceivable. For example, water could be supplied to the gas from the gas source 8, for example, injected.

In this example, a counter pressure valve is used as the pressure control unit 7, which sets the pressure p of the reaction gas via the controllable opening cross section. The counter pressure valve 7 is arranged in the gas conditioning unit 3 downstream of the fuel cell 2. This enables the pressure to be controlled upstream of the fuel cell 2, whereby the pressure control remains uninfluenced by possible pressure losses in the other components of the gas conditioning unit 3.

After the mixing chamber 11, the reaction gas is provided in a reaction gas line 12, which is connected to the fuel cell 2, or more precisely to the cathode C or anode A of the fuel cell 2, with a specific temperature T, a specific relative humidity φ, a specific pressure p, and a specific mass flow $\dot{m}$.

However, this structure of a gas conditioning unit 3 described on the basis of FIG. 1 is only by way of example and other structures of the gas conditioning unit 3 and also other specific embodiments of the humidifier unit 4, mass flow control unit 6, temperature control unit 5, and pressure control unit 7 are also conceivable, of course.

To be able to control the influencing variables, the humidifier unit 4, mass flow control unit 6, temperature control unit 5, and pressure control unit 7 are controllable via a respective manipulated variable. The manipulated variables are computed by a control unit 15, in which a controller R is implemented. In the exemplary embodiment shown in FIG. 1, the humidifier unit 4 is controlled via the mass flow controller 10 for the water vapor using the manipulated variable $u_S$, the mass flow control unit 6 is controlled using the manipulated variable $u_G$, the temperature control unit 5 is controlled using the manipulated variable $\dot{Q}$, and the pressure control unit 7 is controlled using the manipulated variable $u_N$. The respective actuator is actuated using the manipulated variable to induce a change of the influencing variable.

Firstly, a model of the gas conditioning unit 3 is required for the controller design of the controller R for controlling the gas conditioning unit 3. Greatly varying models are also conceivable for this purpose. One advantageous model will be described hereafter, wherein all four influencing variables are taken into consideration. For this purpose, firstly the system equations for the structure according to FIG. 1 are developed.

From the mass balance in the mixing chamber 11 it follows $$\frac{d}{dt}m_G = \dot{m}_{G,in} - \dot{m}_{G,out}$$
$$\frac{d}{dt}m_S = \dot{m}_{S,in} - \dot{m}_{S,out},$$

with the mass $m_G$ of the gas, the mass flow of the gas $\dot{m}_{G,in}$ into the mixing chamber 11, the mass flow of the gas $\dot{m}_{G,out}$ out of the mixing chamber 11, the mass flow of the water vapor $\dot{m}_{S,in}$ into the mixing chamber 11, and the mass flow of the water vapor $\dot{m}_{S,out}$ out of the mixing chamber 11. The mass flows of gas and water vapor out of the mixing chamber 11 are given by $$\dot{m}_{G,out} = \frac{m_G}{m}\dot{m},$$
$$\dot{m}_{S,out} = \frac{m_S}{m}\dot{m}$$

with the total mass m in the gas conditioning unit 3 and the masses $m_G$ of the gas and $m_S$ of the water vapor and the mass flow of the reaction gas $\dot{m}$. It has to be true of course that $m = m_G + m_S$.

From the energy balance of the gas conditioning unit 3 it follows $$\frac{dU}{dt} = \dot{m}_{G,in} \cdot h_{G,in} + \dot{m}_{S,in} \cdot h_{S,in} - \dot{m} \cdot h$$

-continued
$$\frac{dU}{dt} = \frac{d}{dt}(m_G \cdot u_{iG} + m_S \cdot u_{iS}).$$

In this case, U denotes the internal energy and h denotes the specific enthalpy of the gas (marked here and hereafter by index G), of the water vapor (marked here and hereafter by index S), and the reaction gas (here and hereafter without index) after the mixing chamber 11 and $u_i$ denotes the specific internal energy of the gas and the water vapor. The specific enthalpy h of a gas is known to be the product of the specific heat capacity $c_p$ at constant pressure and the temperature T of the gas. In the case of water vapor, the latent heat $r_0$ is also included by addition. The internal energy $u_i$ of a gas is the product of the specific heat capacity $c_v$ at constant volume and the temperature T of the gas. In the case of water vapor, the latent heat $r_0$ is also included by addition. If all of these are inserted into the energy balance and if one takes into consideration the mass balance, the following system equation is obtained, which describes the temperature dynamics of the gas conditioning unit 3.

$$\frac{d}{dt}T = \frac{1}{m_G c_{vG} + m_S c_{vS}} \cdot \left(\dot{m}_{G,in}c_{pG}T_{G,in} + \dot{m}_{S,in}(c_{pS}T_{S,in} + r_0) - \frac{1}{m}\dot{m}(m_G c_{pG}T + m_S(c_{pS}T + r_0)) - \frac{d}{dt}m_G c_{vG}T - \frac{d}{dt}m_S(c_{vS}T + r_0)\right)$$

Furthermore, from the thermodynamic state equation for an ideal gas it follows $$pV = (m_G R_G + m_S R_S)T$$

with the pressure p and the temperature T at the inlet of the fuel cell 2. R denotes in a known manner the gas constant for gas (index G), water vapor (index S), or for the reaction gas (without index). The volume V preferably denotes in this case not only the volume of the mixing chamber 11, but rather also the volumes of the piping in the gas conditioning unit 3. The pressure p and the mass flow $\dot{m}$ of the reaction gas are also decisively influenced by the counter pressure valve 7, which can be modeled as follows.

$$\dot{m} = A \cdot p \sqrt{\frac{2}{RT}} \cdot \psi$$

$$\psi = \sqrt{\frac{\kappa}{\kappa-1}\left[\left(\frac{p_0}{p}\right)^{\frac{2}{\kappa}} - \left(\frac{p_0}{p}\right)^{\frac{\kappa+1}{\kappa}}\right]},$$

$$\kappa = \frac{c_p}{c_v}$$

Therein, A denotes the opening cross section of the counter pressure valve 7 and $p_0$ denotes the ambient pressure.

The relative humidity φ is modeled by $$\varphi = \frac{X}{\frac{R_G}{R_S} + X} \cdot \frac{p}{p_w(T)}, X = \frac{m_S}{m_G},$$

wherein $p_w(T)$ denotes the saturation partial pressure, which is given, for example, by $$p_W(T) = p_m \cdot e^{\frac{C_1 T}{C_2 + T}}.$$

The parameters $p_m$, $C_1$, $C_2$ can be taken, for example, from Plant R. S. et al., "Parameterization of Atmospheric Convection," Vol. 1, Imperial College Press, 2015.

In addition, the dynamics of the actuators is also modeled as a function of the manipulated variables $u_S$, $u_G$, $\dot{Q}$, and $u_N$ in the form of first-order delay elements having the time constants $\tau_1$, $\tau_2$, $\tau_3$, $\tau_4$:

$$\frac{d}{dt}\dot{m}_{G,in} = \frac{1}{\tau_1}(u_G - \dot{m}_{G,in})$$

$$\frac{d}{dt}T_{G,in} = \frac{1}{\tau_2}\frac{1}{c_{pG}\dot{m}_{G,in}}\left(\frac{\dot{Q}}{\dot{m}_{G,in}} - c_{pG}(T_{G,in} - T_{G,0})\right)$$

$$\frac{d}{dt}\dot{m}_{S,in} = \frac{1}{\tau_3}(u_S - \dot{m}_{S,in})$$

$$\frac{d}{dt}\dot{A} = \frac{1}{\tau_4}(u_N - (A - A_0))$$

$T_{G,0}$ and $A_0$ in above equations are predefined offset variables.

It can be seen from the above system equations that a nonlinear multivariable system (MIMO, multiple input multiple output) of the form $$\dot{x} = f(x) + \sum_{i=1}^{m} g_i(x)u_i$$

$$y = h(x)$$

is provided, having the state vector x, input vector u, and output vector y as follows:

$$x = \begin{pmatrix} m_G \\ m_S \\ T \\ \dot{m}_{G,in} \\ T_{G,in} \\ \dot{m}_{S,in} \\ A \end{pmatrix}, u = \begin{pmatrix} u_G \\ \dot{Q} \\ u_S \\ u_N \end{pmatrix}, y = \begin{pmatrix} T \\ p \\ \varphi \\ \dot{m} \end{pmatrix}.$$

In FIG. 1 it is indicated for better comprehension where these variables each occur.

The nonlinearity results from the system functions f(x), g(x) from the state equation and the system function h(x) from the output equation, which are each dependent on the state vector x.

However, the model of the gas conditioning unit 3 is not only nonlinear, but rather the individual state equations are also coupled multiple times, whereby the manipulated variables $u_S$, $u_G$, $\dot{Q}$, $u_N$ of the input vector u cannot be associated with output variables T, p, $\varphi$, $\dot{m}$ in the output vector y. Therefore, multiple output variables are influenced when one of the manipulated variables $u_S$, $u_G$, $\dot{Q}$, $u_N$ is changed. This is shown in FIG. 2.

Figure 2:
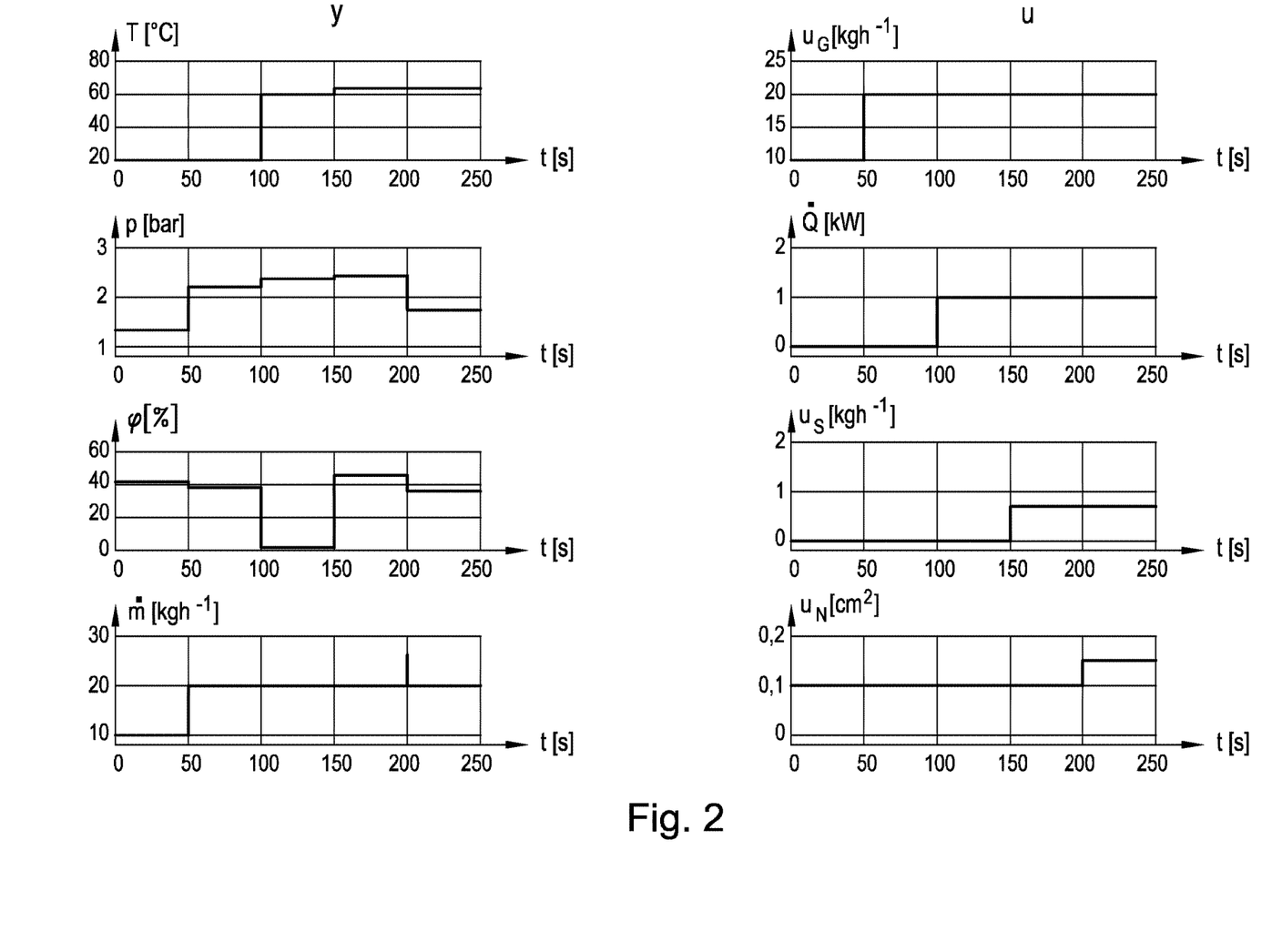
FIG. 2 shows the curve of the output variables over time in the event of changing input variables of the coupled multivariable system.

In FIG. 2, the manipulated variables $u_S$, $u_G$, $\dot{Q}$, $u_N$ are plotted over the time t on the right and the output variables of the output vector y are plotted on the left. At the times 50 s, 100 s, 150 s, and 200 s one of the manipulated variables $u_S$, $u_G$, $\dot{Q}$, $u_N$ was changed in each case. In this case, all output variables T, p, $\varphi$, $\dot{m}$ changed in each case.

For the coupled, nonlinear MIMO System, a controller now has to be designed, with which the gas conditioning unit 3 can be controlled. There are many options for this purpose, wherein one preferred controller design will be described hereafter.

As a first step, the nonlinear, coupled multivariable system $$\dot{x} = f(x) + \sum_{i=1}^{m} g_i(x)u_i$$

$$y = h(x)$$

is decoupled and linearized. For this purpose, the output, i.e., an output variable $y_j$, is differentiated with respect to time in the form $$\frac{d}{dx}\frac{dx}{dt},$$

whereby $$\dot{y}_j = \frac{\partial h_j}{\partial x}f(x) + \sum_{i=1}^{m}\frac{\partial h_j}{\partial x}g_i(x)u_i$$

$$= L_f h_j(x) + \sum_{i=1}^{m} L_{g_i} h_j(x)u_i$$

results. Therein $L_f h$ and $L_g h$ denote the known Lie derivatives of the system function h(x) of the output equation with respect to the system functions f(x) and g(x) of the state equation of the coupled, nonlinear multivariable system. The Lie derivatives $L_f$ and $L_g$ are accordingly defined as $$L_f h_j(x) = \frac{\partial h_j}{\partial x}f(x) \text{ and } L_{g_i} h_j(x) = \frac{\partial h_j}{\partial x}g_i(x).$$

It follows from the above that a manipulated variable $u_i$ has no influence on the respective derivative with respect to time of the output variable $y_j$ if $L_{g_i} h_j(x)=0$. Therefore, each output variable $y_j$ of the output vector y is derived with respect to time as long as the manipulated variable $u_i$ has an influence on the output variable $y_j$, i.e., up to the $\delta_j$-th derivative. The relative degree of the j-th output variable $y_j$ is then denoted by $\delta_j$, from which the following notation results with the Lie derivatives.

$$y_j^{(\delta_j)} = L_f^{\delta_j} h_j + \sum_{i=1}^{m}\left(L_{g_i} L_f^{\delta_j - 1} h_j\right)u_i$$

Therein, $L_f^{\delta_j}$ denotes the $\delta_j$-th Lie derivative and $(\delta_j)$ denotes the $\delta_j$-th derivative with respect to time. When this is applied to all j=1, . . . , m output variables, one obtains, in general matrix notation $$\begin{pmatrix} y_1^{(\delta_1)} \\ y_2^{(\delta_2)} \\ \vdots \\ y_m^{(\delta_m)} \end{pmatrix} = \underbrace{\begin{pmatrix} L_f^{\delta_1} h_1(x) \\ L_f^{\delta_2} h_2(x) \\ \vdots \\ L_f^{\delta_m} h_m(x) \end{pmatrix}}_{l(x)} + \underbrace{\begin{bmatrix} L_{g_1} L_f^{\delta_1-1} h_1(x) & \ldots & L_{g_m} L_f^{\delta_1-1} h_1(x) \\ L_{g_1} L_f^{\delta_2-1} h_2(x) & \ldots & L_{g_m} L_f^{\delta_2-1} h_2(x) \\ \vdots & & \vdots \\ L_{g_1} L_f^{\delta_m-1} h_m(x) & \ldots & L_{g_m} L_f^{\delta_m-1} h_m(x) \end{bmatrix}}_{J(x)} \begin{bmatrix} u_1 \\ u_2 \\ \vdots \\ u_m \end{bmatrix}$$

with the decoupling matrix $J(x)$. The vector which contains the $\delta_j$-th derivatives with respect to time of the output variables y is equated to a new synthetic input vector v, i.e., $v=(v_1\ v_2\ \ldots\ v_m)^T=(y_1^{(\delta_1)}\ y_2^{(\delta_2)}\ \ldots\ y_m^{(\delta_m)})^T$. Therefore $v=l(x)+J(x)u$ results. It follows therefrom that the relationship between the new synthetic input v and the output variables in the output vector y of the multivariable system is decoupled and can be comprehended as a chain of integrators. If the new synthetic input variable $v_j$ is integrated $\delta_j$-times according to time, the output variable $y_j$ of the multivariable system is obtained.

If a new state vector z is now also defined in the form $$z = \begin{pmatrix} z_1 \\ z_2 \\ \vdots \\ z_{\delta_1} \\ \vdots \\ \vdots \\ \vdots \\ z_n \end{pmatrix} = \begin{pmatrix} h_1(x) \\ L_f h_1(x) \\ \vdots \\ L_f^{\delta_1-1} h_1(x) \\ h_2(x) \\ L_f h_2(x) \\ \vdots \\ L_f^{\delta_2-1} h_2(x) \\ \vdots \\ L_f^{\delta_m-1} h_m(x) \end{pmatrix}$$

a new multivariable system is then obtained as a linear, non-coupled state space model according to $$\dot{z} = A_c z + B_c v$$

with $A_c = \begin{pmatrix} A_{c,1} & 0 & \ldots & 0 \\ 0 & A_{c,2} & \ldots & 0 \\ \vdots & \vdots & & \vdots \\ 0 & 0 & \ldots & A_{c,m} \end{pmatrix}$ and $B_c = \begin{pmatrix} B_{c,1} & 0 & \ldots & 0 \\ 0 & B_{c,2} & \ldots & 0 \\ \vdots & \vdots & & \vdots \\ 0 & 0 & \ldots & B_{c,m} \end{pmatrix}$, and also the $(\delta_j \times \delta_j)$ matrix $A_{c,j} = \begin{pmatrix} 0 & 1 & 0 & \ldots & 0 \\ 0 & 0 & 1 & \ldots & 0 \\ \vdots & \vdots & \vdots & & \vdots \\ 0 & 0 & 0 & \ldots & 1 \\ 0 & 0 & 0 & \ldots & 0 \end{pmatrix}$ and the $(\delta_j \times 1)$ vector $B_{c,j} = \begin{pmatrix} 0 \\ 0 \\ \vdots \\ 0 \\ 1 \end{pmatrix}.$ Arbitrary linear control theory can then be applied to the linear, non-coupled multivariable system of the form $\dot{z}=A_c z+B_c v$ and any linear controller can be designed for this purpose.

For the control, it is a desired goal for the set output variables $y_j$ to follow the predefined setpoint variables $y_{j,dmd}$ as well as possible (trajectory tracking). The control is to be as immune to interference as possible. For this purpose, for example, a known controller R having two degrees of freedom (Two-Degree-of-Freedom (2DoF) controller) suggests itself, which consists of a feedforward controller FW and a feedback controller FB and is shown, for example, in FIG. 3. The feedforward controller FW is to ensure the trajectory tracking and the feedback controller FB is to ensure the correction of possible interference.

Figure 3:
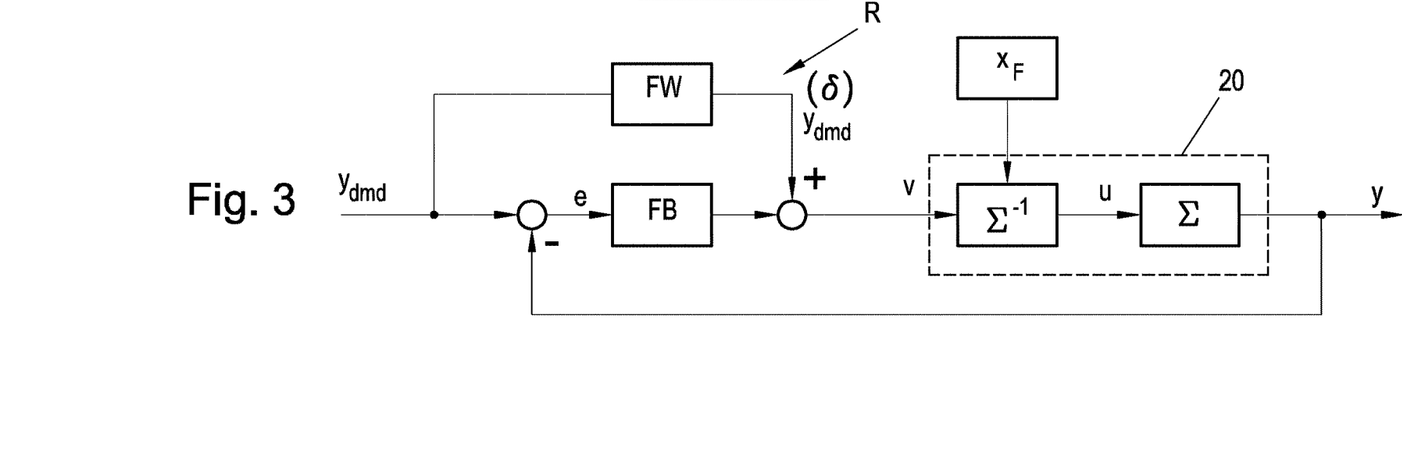
FIG. 3 shows a controller according to the invention having two degrees of freedom for the gas conditioning.

A new input variable $v_j$ of the decoupled, linear multivariable system 20 corresponds to the $\delta_j$-th derivative of the output variable $y_j$. The feedforward part of the controller R therefore results as the $\delta_j$-th derivatives of the setpoint variables $y_{j,dmd}$. Each setpoint variable $y_{j,dmd}$ of the setpoint variable vector $y_{dmd}$ is derived in accordance with its relative degree $\delta_j$ and connected additively to the output of the feedback controller FB.

The feedback controller FB receives in a known manner a control error vector e as the deviation between the setpoint variables $y_{j,dmd}$ in the setpoint variable vector $y_{dmd}$ and the present actual values of the output variables y, i.e., $e_j(t)=y_j(t)-y_{j,dmd}(t)$. In principle, any arbitrary feedback controller can be used to correct the error and sufficient methods are known for determining such a controller. A simple feedback controller FB will be described hereafter.

The feedback controller FB is based on the relative degree $\delta_j$ and the following error parts $e_{j,\delta_j}$ are defined.

$$e_{j,0} = \int_0^t e_j(\tau) d\tau,\ e_{j,1} = e_j,\ e_{j,2} = \dot{e}_j,\ \ldots\ ,\ e_{j,\delta_j} = e_j^{(\delta_j-1)}$$

A new input variable $v_j$ of the decoupled, linear multivariable system 20 according to FIG. 3 can therefore be written as $$v_j = y_{j,dmd}^{(\delta_j)} - K_{j,0} e_{j,0} - K_{j,1} e_{j,1} - \ldots - K_{j,\delta_j} e_{j,\delta_j}.$$

For a relative degree $\delta_j$ of two, an analogy to a PID controller can be established, wherein $K_{j,0}$ forms an integral component, $K_{j,1}$ forms a proportional component, and $K_{j,2}$ forms a differential component. For a relative degree $\delta_j$ of one, a PI controller would result.

This results in vectorial notation as $$\dot{e}(t)=(A_c-B_c K)e(t)$$

with the above defined matrices $A_c$, $B_c$, and $$K = \begin{bmatrix} K_1 & 0 & 0 & 0 \\ 0 & K_2 & \vdots & \vdots \\ \vdots & \vdots & \ddots & 0 \\ 0 & 0 & 0 & K_m \end{bmatrix}\ \text{and}\ K_j = \begin{bmatrix} K_{j,0} & K_{j,1} & \ldots & K_{j,\delta_j} \end{bmatrix}.$$

The controller parameters $K_j$ of the feedback controller FB can subsequently be defined to achieve a desired control behavior. There are also various known approaches for this purpose, for example, the method of pole placement with $(A_c-B_cK)$. In this case, all desired poles are preferably located to the left of the imaginary axis to ensure the stability. The controller parameters $K_j$ can be determined in this manner.

For the above-described linearization and decoupling of the nonlinear, coupled multivariable system, characterized by $\Sigma^{-1}$ in FIG. 3, the state variables x are also required in addition, as is apparent from the equations and as also indicated in FIG. 3.

For this purpose, the state variables x can be measured in the gas conditioning unit 3, preferably at every sampling time of the controller. Alternatively, the state variables x can also be estimated by an observer from the input variables u and/or output variables y, preferably again at every sampling time of the control. However, the state variables x can also be computed in another simple manner.

A nonlinear multivariable system of the general form $\dot{x}=f(x,u)$ has the property of differential flatness if there is a vector of differential independent output variables $y=(y_1, \ldots, y_m)$, so that the state variables x and the input variables u are the functions of this output y, in this case designated as flat, and its derivatives:

$$y=F(x)$$

$$x=\Phi(y,\dot{y}, \ldots ,y^{(n-1)})$$

$$u=\Psi(y,\dot{y}, \ldots ,y^{(n)})$$

As a result, for any arbitrary time curve of the output variable y(t), the associated time curve of the input variables u(t) and the time curve of the state variables x(t) can be computed solely from the time curve of the output variable y(t) without integrating the differential equations of the multivariable system.

It can be shown that the above-described nonlinear multivariable system is differentially flat.

Therefore, the state variables x can simply be computed from the time curve of the setpoint variables $y_{dmd}$ and neither have to be measured nor estimated. This is indicated in FIG. 3 by the index F at the state variables x. On the test stand 1, the time curve of the setpoint variables $y_{dmd}$ is defined, for example, by the test run to be carried out and is thus known. The state variables $x_F$ can thus be calculated beforehand off-line from the time curve of the setpoint variables $y_{dmd}$ and are then available for the control when the test run is carried out.

The procedure described hereafter can be used for the control of the gas conditioning unit 3 for the operation of a fuel cell 2.

Firstly, if need be, a controller R is designed as described above, which has a good trajectory tracking and is stable and robust, i.e., is substantially insensitive to interference. This is primarily achieved, for example, by the selection of the poles of the feedback controller FB. However, an already parameterized controller R can possibly also be used. For the operation of the fuel cell 2, the setpoint variable $y_{dmd}(t)$ is predefined over time for the output variables T, p, φ, ṁ used as setpoint variables. This setpoint variable curve $y_{dmd}(t)$ over time can result from the real operation of the fuel cell 2, can be predefined, or can be defined by a test run for testing the fuel cell 2 on a test stand. In real operation of the fuel cell 2 in a machine or facility, for example, a trajectory may be computed during the transition from one operating point to a new operating point, along which the fuel cell 2 or the gas conditioning is to be guided. This can take place, for example, in a fuel cell control unit. The fuel cell control unit also specifies the operating points from the real operation in this case. Criteria for the trajectory are, for example, a faster transition, wherein the transient curve shall not be damaging to the fuel cell 2. The state variables $x_F(t)$ can thus be calculated beforehand off-line from the time curve of the setpoint variables $y_{dmd}(t)$. Alternatively, the state variables $x_F(t)$ can also be computed or measured online at any sampling time of the control (i.e., at any time at which new manipulated variables are computed). The sampling time for the control is typically in the millisecond range, for example, the control is operated on a test stand 1 at 100 Hz (10 ms sampling time). The setpoint variable curve $y_{dmd}(t)$ over time, for example, according to the test run, is thereupon applied to the gas conditioning unit 3. Desired measurements can also be carried out on the fuel cell 2 on the test stand 1 for this purpose, for example, to ascertain the behavior of the fuel cell 2 during the predefined test run.

Figure 4:
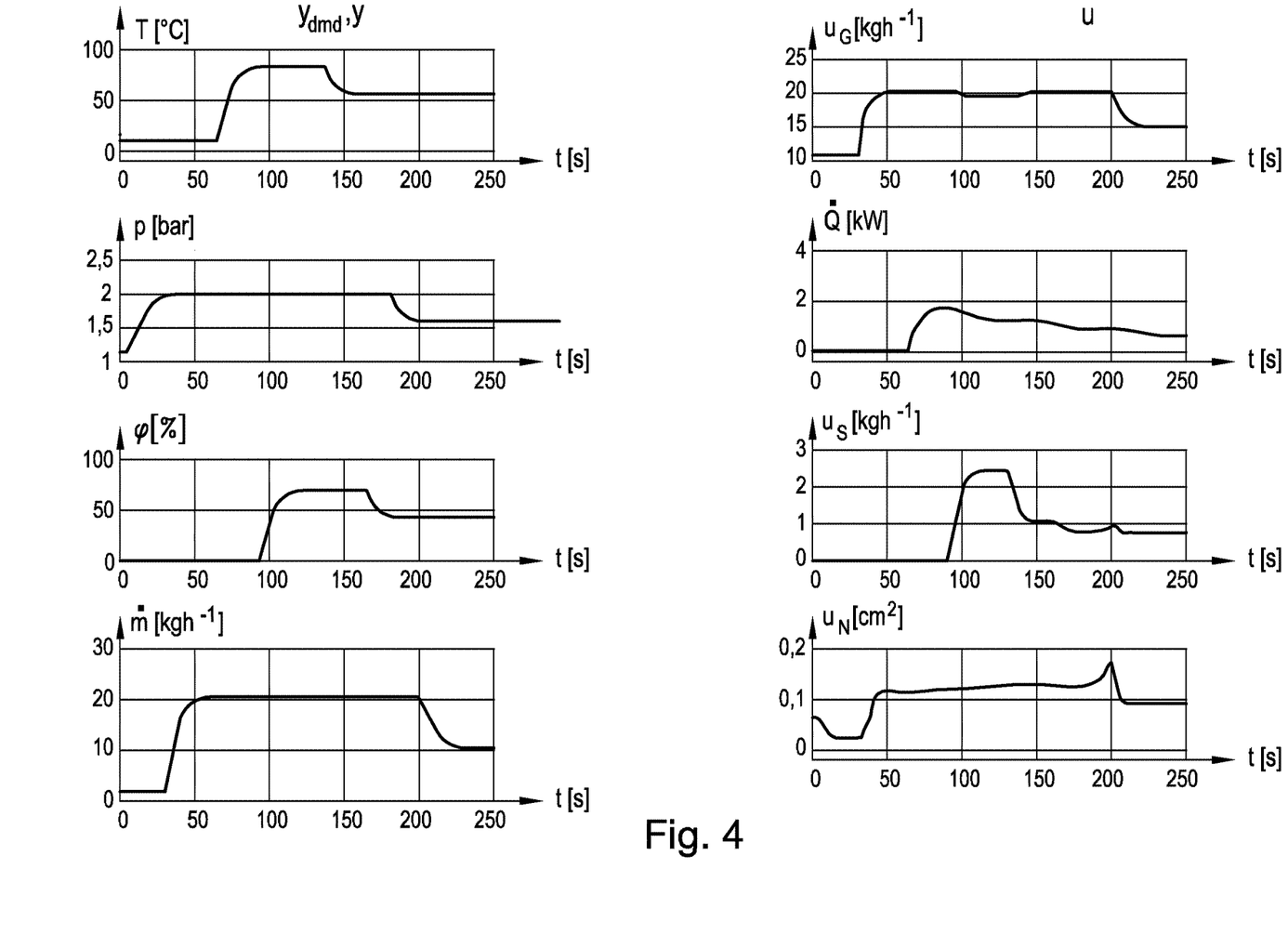
FIG. 4 shows the curve of the output variables over time in the event of changing input variables in the decoupled multivariable system according to the invention.

Such a test run in the form of a predefined setpoint variable curve $y_{dmd}(t)$ over time was simulated and the result is shown in FIG. 4. The following parameters were assumed for the simulation: adjustment range of the humidifier unit 4 $u_S=[0-30\ \text{kgh}^{-1}]$, adjustment range of the temperature control unit 5 $\dot{Q}=[0-9\ \text{kW}]$, adjustment range of the mass flow control unit 6 $u_G=[4-40\ \text{kgh}^{-1}]$, adjustment range of the pressure control unit 7 $u_N=[0-2\ \text{cm}^2]$, control range of the temperature $T=[20-100°\ \text{C.}]$, control range of the pressure $p=[1.1-3\ \text{bar}]$, control range of the relative humidity $\varphi=[0-100\%]$, and control range of the mass flow $\dot{m}=[0-70\ \text{kgh}^{-1}]$. In addition, the following parameters were also defined: volume $V=14,137\ \text{cm}^3$, temperature of the water vapor $T_S=141°\ \text{C.}$, ambient pressure $p_0=1$ bar, specific heat capacity of the gas $c_{p,G}=1.04\ \text{kJ kg}^{-1}\ \text{K}^{-1}$, specific heat capacity of the water vapor $c_{p,S}=1.89\ \text{kJ kg}^{-1}\ \text{K}^{-1}$. The poles of the feedback controller FB were defined for the output variables $y_j$ with relative degree $\delta_j=2$ at $s_1=-1$, $s_{2,3}=-8\pm 1j$ and for the output variables $y_j$ with relative degree $\delta_j=1$ at $s_{1,2}=-5$.

The predefined setpoint variable curve $y_{dmd}(t)$ over time is shown on the left in FIG. 4. The input variables u, which are set by the controller R, are shown on the right thereof. The output variables y computed in the simulation are also shown in the left diagram. On the one hand, the outstanding trajectory tracking of the controller can be seen, i.e., the output variables y follow the setpoint variables $y_{dmd}$ without recognizable deviations. However, it is also apparent on the other hand that now the individual output variables $y_j$ can be set decoupled from one another. A change of an output variable $y_j$ leaves the other output variables untouched. For this purpose, the controller R computes at every sampling time the combination of the new input variables v, which result in the input variables u which have to be set using the actuators of the gas conditioning unit 3.

The invention was explained on the basis of the control of all four influencing variables or output variables $y_j$, i.e., temperature T, pressure p, relative humidity φ, and mass flow ṁ. However, only three of these four influencing variables can also be controlled. For the fourth, noncontrolled influencing variables, corresponding assumptions can be made, for example, this fourth influencing variable could be kept constant. The dimension of the above system equations would be reduced by one in the case of only three controlled influencing variables. The fundamental approach for decoupling and linearization of the coupled, nonlinear multivariable system, nor the described approach of the controller design, would not be affected thereby, however.

However, the setpoint variable corresponding to the fourth, noncontrolled influencing variable could also simply be predefined according to the assumptions. This setpoint variable could thus be kept constant, for example, in the predefined setpoint variable curve $y_{dmd}(t)$.

The applications of the controlled gas conditioning unit 3 for gas conditioning of a reaction gas of a fuel cell 2 are manifold. The gas conditioning can be used in particular both on a test stand (stack or cell test stand), but also in a fuel cell system, for example, in a vehicle (ship, train, airplane, passenger automobile, truck, bicycle, motorcycle, etc.), in a power plant (also in combined heat and power systems), in emergency power systems, in a handheld device, up to any device in which fuel cell systems can be installed. The gas conditioning can thus be used both in real operation of a fuel cell in a fuel cell system or also on a test stand for testing or developing a fuel cell.

The gas conditioning is fundamentally also applicable for other applications, for example, for the conditioning of the intake air of an internal combustion engine, also again in real operation or on a test stand. However, gases in process technology or medical technology could also be conditioned thereby. The gas conditioning could also be used in measurement technology, to condition a measuring gas exactly for an accurate measurement.

The invention claimed is:

1. A gas conditioning system for a reaction gas of a fuel cell comprising:
    a gas source configured and arranged to provide the reaction gas to the gas conditioning system;
    a humidifier unit configured and arranged to humidify the reaction gas and thereby achieve a desired relative humidity of the reaction gas;
    a temperature control unit configured and arranged to maintain the temperature of the reaction gas at a set temperature;
    a mass flow control unit configured and arranged to control mass flow rate of the reaction gas; and
    a pressure control unit configured and arranged to control the pressure of the reaction gas,
    a control unit including a controller configured and arranged to control the gas conditioning system by computing manipulated variables for at least three actuators from the group of the humidifier unit, the temperature-control unit, the mass flow control unit, and the pressure control unit, to thereby set a predefined time curve of at least three associated influencing variables on the operation of the fuel cell from the group of the relative humidity, the temperature, the mass flow, and the pressure of the reaction gas in a reaction gas line, and wherein
    the controller is designed on the basis of a model of the gas conditioning unit in the form of a coupled, nonlinear multivariable system of the form $$\dot{x} = f(x) + \sum_{i=1}^{m} g_i(x) u_i$$

$$y = h(x),$$

wherein the multivariable system is decoupled and linearized by means of Lie derivatives for controller design.

2. A method for controlling a gas conditioning unit for a fuel cell comprising:
    designing a controller using a coupled, nonlinear multivariable system of the form $$\dot{x} = f(x) + \sum_{i=1}^{m} g_i(x) u_i$$

$$y = h(x)$$

as model of the gas conditioning unit, in that the coupled, nonlinear multivariable system is decoupled and linearized by means of Lie derivatives and the controller is designed for the decoupled, linear multivariable system,
    computing with the controller, for every sampling time of the control, from predefined setpoint variables ($y_{j,dmd}$), manipulated variables $\dot{Q}$ for at least three provided actuators of the gas conditioning unit from the group of a humidifier unit for humidifying the reaction gas to set a relative humidity of the reaction gas, a temperature control unit to set a temperature of the reaction gas, a mass flow control unit to control the mass flow rate of the reaction gas, and a pressure control unit to control the pressure of the reaction gas; and
    operating the at least three actuators to set the manipulated variables at every sampling time of the control.

3. The method according to claim 2, characterized in that each output variable ($y_j$) of the coupled, nonlinear multivariable system is derived with respect to time according to its relative degree ($\delta_j$) in the form $$y_j^{(\delta_j)} = L_f^{\delta_j} h_j + \sum_{i=1}^{m} \left( L_{g_i} L_f^{\delta_j - 1} h_j \right) u_i,$$

wherein $L_f^{\delta_j}$ denotes the $\delta_j$-th Lie derivative, and that the $\delta_j$-th derivatives with respect to time of the output variables ($y_j$) are equated with new input variables from which a linear, non-coupled state space model of the form $\dot{z} = A_c z + B_c v$ can be derived, having defined matrices $A_c$ and $B_c$ and a new state vector $$z^T = (h_1(x) L_f h_1(x) \ldots L_f^{\delta_1 - 1} h_1(x) h_2(x) L_f h_2(x) \ldots L_f^{\delta_2 - 1} h_2(x) \ldots L_f^{\delta_m - 1} h_m(x))^T.$$

4. The method according to claim 3, characterized in that the controller is designed for the linear, non-coupled state space model of the form $\dot{z} = A_c z + B_c v$.

5. The method according to claim 4, characterized in that a controller having two degrees of freedom having a feedforward controller (FW) and a feedback controller is designed, wherein the outputs of the feedforward controller (FW) and the feedback controller are added to the new input variables (v) and the feedforward part results from the $\delta_j$-th derivatives with respect to time of the setpoint variables ($y_{j,dmd}$), and the feedback part corrects the error (e) between the present actual values of the output variables ($y_j$) and the values of the setpoint variables ($y_{j,dmd}$).

6. The method according to claim 5, characterized in that error components ($e_{j,\delta_j}$) are defined according to $$e_{j,0} = \int_0^t e_j(\tau) d\tau, \ e_{j,1} = e_j, \ e_{j,2} = \dot{e}_j, \ \ldots \ , e_{j,\delta_j} = e_j^{(\delta_j - 1)},$$

from which $\dot{e}(t) = (A_c - B_c K) e(t)$ results, having the defined matrices $A_c$ and $B_c$ and a matrix K having parameters of the feedback controller, which are defined to achieve a desired control behavior of the feedback controller.

7. The method according to claim 2, characterized in that, using the property of the differential flatness of the nonlinear, coupled multivariable system, the time curve of the state variables (x) are calculated according to $$y = F(x)$$

$$x = \Phi(y, \dot{y}, \ldots, y^{(n-1)})$$

$$u = \Psi(y, \dot{y}, \ldots, y^{(n)})$$

beforehand from the time curve of the setpoint variables ($y_{j,dmd}$).

* * * * *